US008267637B2

(12) United States Patent  
Ouellette et al.

(10) Patent No.: US 8,267,637 B2
(45) Date of Patent: Sep. 18, 2012

(54) APPARATUS FOR VERTICALLY ALIGNING AND ACCUMULATING STACKS OF PALLETS DELIVERED TO A PALLET DISPENSER

(75) Inventors: Joseph F. Ouellette, Glendale, MO (US); Richard J. Ouellette, Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 2 days.

(21) Appl. No.: 12/974,193

(22) Filed: Dec. 21, 2010

(65) Prior Publication Data

US 2012/0006650 A1 Jan. 12, 2012

Related U.S. Application Data

(63) Continuation-in-part of application No. 12/833,644, filed on Jul. 9, 2010, now abandoned.

(51) Int. Cl.
*B65G 47/26* (2006.01)
(52) U.S. Cl. ............... 414/789.1; 414/797.6; 198/836.3
(58) Field of Classification Search ............... 414/788.9, 414/789.1, 797.4, 797.6, 798.1, 927; 198/416, 198/836.1, 836.2, 837
See application file for complete search history.

(56) References Cited

U.S. PATENT DOCUMENTS

| | | | |
|---|---|---|---|
| 3,342,349 A * | 9/1967 | Sheldon et al. | 414/795.8 |
| 4,557,656 A | 12/1985 | Ouellette | |
| 4,964,782 A * | 10/1990 | DeCrane | 414/798.1 |
| 5,096,369 A | 3/1992 | Ouellette | |
| 5,118,243 A * | 6/1992 | Huebner et al. | 414/404 |
| 5,197,849 A * | 3/1993 | Tubke | 414/788 |
| 5,435,690 A * | 7/1995 | Binning | 414/791.6 |
| 5,484,062 A * | 1/1996 | Rich | 209/587 |
| 5,567,102 A * | 10/1996 | Tanaka | 414/274 |
| 5,607,282 A * | 3/1997 | Brannen et al. | 414/796.3 |
| 5,785,482 A * | 7/1998 | Tanaka | 414/270 |
| 5,944,477 A * | 8/1999 | Shill | 414/788 |
| 6,139,254 A | 10/2000 | Ouellette | |
| 6,155,775 A * | 12/2000 | Depinet et al. | 414/796.4 |
| 6,209,709 B1 | 4/2001 | Ouellette | |
| 6,378,695 B1 * | 4/2002 | Rinne | 198/836.3 |
| 6,632,067 B1 | 10/2003 | Ouellette | |
| 6,748,837 B2 * | 6/2004 | Benjamin et al. | 83/435.2 |
| 6,944,943 B2 * | 9/2005 | Cho et al. | 29/740 |
| 7,361,130 B2 * | 4/2008 | Ahlers et al. | 493/269 |
| 7,544,038 B2 * | 6/2009 | Gerding et al. | 414/794.9 |
| 7,670,100 B2 * | 3/2010 | Hannen et al. | 414/789.1 |

\* cited by examiner

*Primary Examiner* — Douglas Hess
(74) *Attorney, Agent, or Firm* — Evans & Dixon, LLC; Joseph M. Rolnicki (57) ABSTRACT

An apparatus vertically realigns pallets in a stack of pallets. The apparatus has left and right panels with upper portions that are angled outwardly, and lower portions that are substantially vertical. Misaligned pallets in a stack placed in the apparatus engage the upper portions of the panels and are moved toward vertical alignment as the stack is lowered into the apparatus. The apparatus also includes compression plates that are movable between first and second positions relative to the apparatus. In the first positions, the compression plates have surfaces that angle toward each other and engage with misaligned pallets in the stack of pallets as the stack is moved from the apparatus toward a pallet dispenser. In the second position, the compression plates pivot toward the rear of the stack of pallets exiting the apparatus and push the stack into the pallet dispenser, thereby achieving additional vertical alignment of the stack.

21 Claims, 10 Drawing Sheets

APPARATUS FOR VERTICALLY ALIGNING AND ACCUMULATING STACKS OF PALLETS DELIVERED TO A PALLET DISPENSER

RELATED APPLICATIONS

This patent application is a continuation-in-part of patent application Ser. No. 12/833,644, which was filed on Jul. 9, 2010, and is abandoned.

BACKGROUND OF THE INVENTION

1. Field of the Invention

The present invention pertains to an apparatus that first vertically aligns from side to side pallets at the bottom of a stack of pallets supplied to the apparatus, then accumulates one or more of the stacks of pallets having the side-to-side aligned bottom pallets, then vertically aligns from front to back the pallets at the bottom of a stack as the apparatus delivers the stack of pallets to a pallet dispenser.

2. Description of the Related Art

A pallet or, more specifically, a shipping pallet is generally known as a rectangular portable platform that supports goods that are placed or stacked on the pallet. Prior art pallets are typically constructed of wood or plastic. Objects placed or stacked on the pallet are bound in some manner to the pallet. The objects can then be moved with the pallet, usually by a forklift. Pallets are conventionally used in the transportation of objects from one location to another, for example, in the transportation of goods from a manufacturer to a distributor.

Manufacturers typically keep a large number of pallets on hand for use in shipping their products. The pallets are usually stored in stacks. When needed, a stack of pallets is usually moved by a forklift to a pallet dispenser that dispenses one pallet at a time from the stack to a conveying system of the manufacturer. The conveying system moves the pallet to a location where the manufacturer's goods are stacked on the pallet and then bound to the pallet for shipping from the manufacturer.

There are a number of known different types of pallet dispensers in the prior art. For example, there are pallet dispenser constructions having four sides and a top opening. Pallet dispensers of this type are supplied with a stack of pallets on the top of the dispenser. A forklift usually will pick up a stack of pallets and place the stack of pallets on top of the dispenser. This type of pallet dispenser will move the stack of pallets downwardly into the dispenser and will separate a pallet from the bottom of the stack and dispense the pallet to a conveying system. As the dispenser dispenses one pallet at a time from the bottom of the stack, the remainder of the stack continues to move incrementally downwardly into the dispenser.

As the stack of pallets is moved downwardly into the dispenser, the bottom few pallets in the stack engage against and slide downwardly along guide surfaces inside the four side walls of the dispenser. The sliding engagement of the bottom few pallets along the guide surfaces centers the bottommost pallets of the stack as the pallets move downwardly so that they are properly aligned for dispensing by the pallet dispenser.

There are also known robotic pallet dispensers that pick up a pallet one at a time from the top of a stack of pallets and then place the picked up pallet on a conveyor. In order for a robotic pallet dispenser to operate properly, the stack of pallets from which the robotic dispenser picks up the top pallet must be sufficiently vertically aligned and placed at a specific position relative to the robotic dispenser so that the robotic dispenser knows the location of the stack of pallets and can separate a pallet from the top of the stack to dispense the separated pallet.

Prior art pallet dispensers of the types described above, as well as other types of known prior art pallet dispensers have the common drawback of the need to periodically replenish the stack of pallets being dispensed before the stack gets too low and runs out. If a pallet dispenser runs out of pallets, the pallet dispensing process stops, and likely the manufacturers entire pallet conveying and loading system stops. Therefore, the forklift operator who replenishes the stack of pallets at the pallet dispenser must keep a constant eye on the stack of pallets in the pallet dispenser and repeatedly return to the pallet dispenser to replenish the stack of pallets in the dispenser. This significantly limits the time a forklift operator can be away from the pallet dispenser completing other jobs.

SUMMARY OF THE INVENTION

What is needed to overcome the drawbacks associated with prior art pallet stack alignment and dispensing systems is an apparatus that not only vertically aligns a stack of pallets sufficiently to enable the stack of pallets to be dispensed by a pallet dispenser, but also enables accumulating one or more stacks of pallets to be supplied to the pallet dispenser, thereby eliminating the need for a forklift operator to repeatedly return to the pallet dispenser and replenish the pallets in the pallet dispenser.

The aligning and accumulating apparatus of the invention overcomes the earlier-described disadvantages associated with prior art pallet dispensers. This results in an overall improvement in the time efficiency of a manufacturer's conveying system.

The apparatus of the invention initially vertically aligns bottom portions of a stack of pallets from side to side prior to the stack of pallets being moved to a pallet dispenser, and then further vertically aligns the bottom portion of the stack from front to back as the stack is delivered to the pallet dispenser. Additionally, the apparatus provides for accumulating one or more of the side-to-side aligned stacks of pallets to be supplied to the pallet dispenser. The apparatus of the invention could be designed for use with most any type of prior art pallet dispenser that has been converted to an open front pallet dispenser.

The typical pallet dispenser is comprised of a generally rectangular base that is dimensioned to support a vertical stack of pallets in an interior area of the dispenser. A dispenser conveyor is positioned at the bottom of the base interior. The dispenser conveyor is operable to receive and support a stack of pallets fed into the pallet dispenser, to separate a pallet from the bottom of the stack of pallets in the pallet dispenser, and move the separated pallet out of the pallet dispenser and to a conveyor system that conveys the pallet to a location where objects are positioned or stacked on the pallet.

The pallet dispenser used with the alignment and accumulating apparatus of the invention is an open front pallet dispenser. Pallet dispensers of this type typically have left and right alignment surfaces on opposite sides of the dispenser interior, a rear surface between the left and right alignment surfaces and a forward opening or input opening of the pallet dispenser through which a stack of pallets is fed into the pallet dispenser. The horizontal spacing between the left and right alignment surfaces is slightly larger than the width of a pallet of a stack of pallets intended to be conveyed into the pallet dispenser. This difference in the horizontal spacing of the pallet dispenser left and right alignment surfaces and the width dimension of a typical pallet allows for a limited amount of vertical misalignment of pallets in a stack intended to be conveyed into the pallet dispenser.

The aligning and accumulating apparatus of the invention is basically comprised of a first alignment device that initially aligns from side to side the bottom three to six pallets (depending on the pallet size) of a stack of pallets positioned in the first alignment device, a conveyor that conveys the initially vertically aligned stack of pallets out of the first alignment device to a pallet dispenser, and a second alignment device adjacent the pallet dispenser that completes the vertical alignment from front to back of the bottom three to six pallets in the stack received in the pallet dispenser. The aligning and accumulating apparatus of the invention enables the accumulation of at least one additional stack of pallets in the first alignment device as a second stack of pallets is being dispensed by the pallet dispenser. Furthermore, by extending the length of the conveyor between the first alignment device and the pallet dispenser, additional initially aligned stacks of pallets can be accumulated on the length of the conveyor between the first alignment device and the pallet dispenser.

The first alignment device of the invention is basically comprised of a base having a generally horizontal rectangular configuration that is dimensioned sufficiently large from side to side to receive and support to a vertical stack of pallets on the base.

The base supports a conveyor having a length with opposite input and output ends and having opposite left and right sides. The base conveyor output end is positioned adjacent a front opening of the pallet dispenser. The length of the conveyor between the first alignment device and the pallet dispenser could be dimensioned to support one or more stacks of pallets that have had their bottom three to six pallets vertically aligned from side to side by the first alignment device. This enables an accumulation of stacks of pallets that are ready for use by the open front pallet dispenser. The conveyor has at least one conveying surface that extends the length of the conveyor. The conveying surface is operable to support a stack of pallets and move the stack of pallets in a direction of movement from the conveyor input end to the conveyor output end, through the pallet dispenser front opening and into the interior of the pallet dispenser.

A left panel is supported by the base of the first alignment device adjacent the left side of the conveyor. The left panel extends along the conveyor length and has a substantially flat, vertically oriented surface that faces toward the conveyor. A left top flange projects upwardly from the top of the left panel and generally extends along the left panel length. The left top flange is angled away from the conveyor.

A right panel is supported by the base of the first alignment device adjacent the right side of the conveyor. The right panel extends along the conveyor length and has a substantially flat, vertically oriented surface that faces toward the conveyor. A right top flange projects upwardly from the top of the right panel and generally extends along the right panel length. The right top flange is angled away from the conveyor.

There is a horizontal spacing distance between the left panel surface and the right panel surface. This horizontal spacing distance is slightly smaller than the horizontal spacing distance between the pallet dispenser left and right alignment surfaces. This enables the first alignment device to initially vertically realign from side to side the pallets in a bottom portion of a pallet stack (three to six pallets depending on the vertical height of each pallet) that has been placed in the first alignment device, where the side to side width dimension of the realigned pallets in the stack will allow the stack to enter into the interior of the pallet dispenser.

The second alignment device of the invention comprises a left compression plate positioned adjacent the conveyor output end and adjacent the left panel. The left compression plate has a surface that is movable between first and second positions relative to the conveyor output end.

The second alignment device also comprises a right compression plate positioned adjacent the conveyor output end and adjacent the right panel. The right compression plate has a surface that is movable between first and second positions relative to the conveyor output end.

In the first positions of the left and right compression plates, the left and right plate surfaces are angled away from each other and form a funnel in the direction of movement of the conveyor surface. When an initially aligned side-to-side stack of pallets is moved from the first alignment device toward the pallet dispenser, any engagement of a pallet in the stack with either of the left and right plate surfaces will result in the plate surface urging the engaging pallet toward the center of the apparatus conveyor and the center of the pallet dispenser. When the left and right plates are moved from their first positions toward their second positions after the stack of pallets has arrived in the pallet dispenser, the left and right plate surfaces pivot toward the conveyor and then along the direction of movement of the conveyor surface. This enables the left and right plate surfaces to engage with the bottom portion of the stack of pallets at the back or rear of the stack and push the bottom portion of the stack of pallets in the direction of movement into the pallet dispenser. The left and right plate surfaces continue to push the bottom portion of the stack of pallets into the pallet dispenser interior and into engagement with the rear surface of the pallet dispenser to further vertically align the pallets in the bottom portion of the stack from front to back.

When the conveyor of the apparatus has an extended length between the first alignment device and the pallet dispenser to allow for the accumulation of several stacks of initially aligned pallets between the first alignment device and the pallet dispenser, the left and right compression plates of the second alignment device are positioned on opposite sides of the conveyor at the front opening of the pallet dispenser.

In the above manner, the aligning and accumulating apparatus of the invention enables accumulating at least one additional stack of pallets in the first alignment device as a second stack of pallets is being dispensed by the pallet dispenser. The apparatus also allows for the initial side to side alignment of a bottom portion of the stack of pallets positioned in the first alignment device, and then the completion of the vertical alignment from front to back of the bottom portion of the stack of pallets as the stack of pallets is moved into the pallet dispenser. In addition, by extending the length of the conveyor between the first alignment device and the second alignment device and the pallet dispenser, several stacks of pallets having their bottom portions initially aligned from side to side can be supported on the conveyor between the first alignment device and the second alignment device and the pallet dispenser, thereby enabling increased pallet stacks accumulation.

BRIEF DESCRIPTION OF THE DRAWINGS

Further features of the apparatus of invention are set forth in the following detailed description of the apparatus and in the following drawing figures.

DETAILED DESCRIPTION OF THE APPARATUS
OF THE INVENTION

Figure 1:
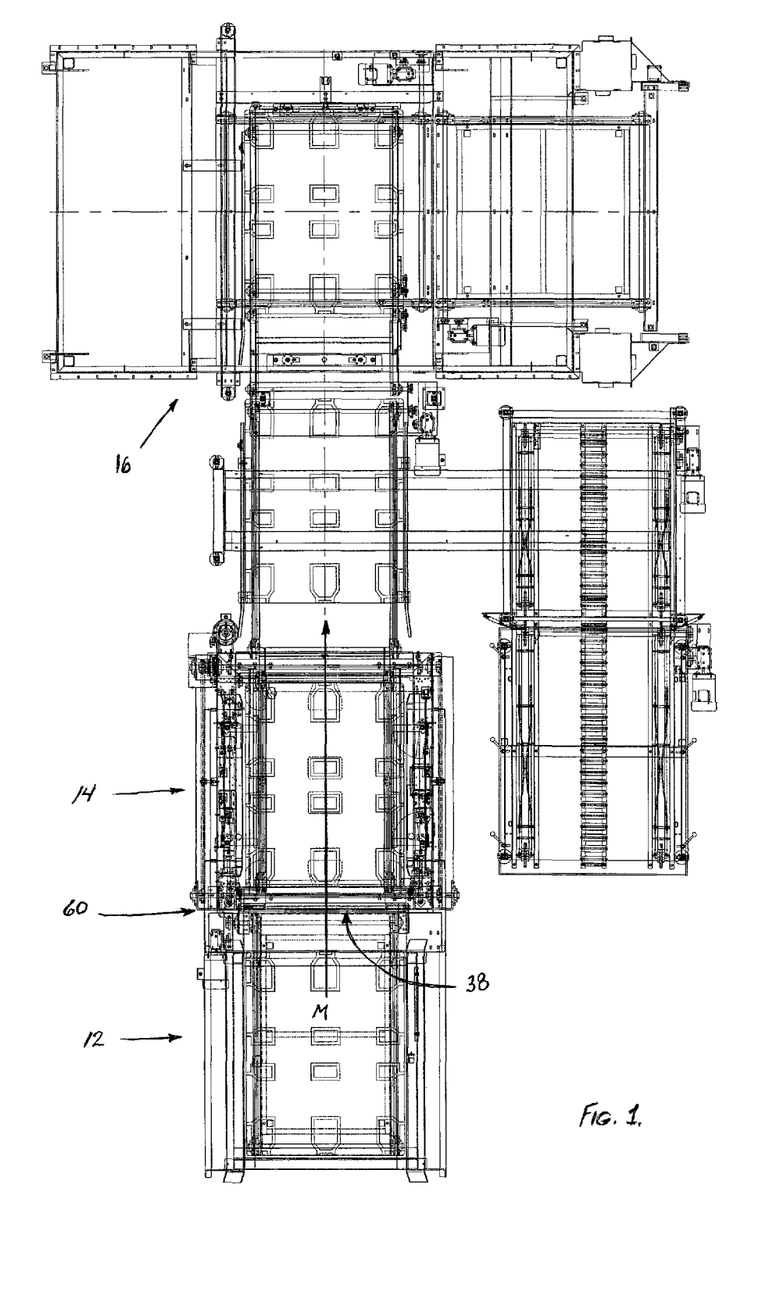
FIG. 1 is a plan view of the aligning and accumulating apparatus of the invention including the first alignment device that vertically aligns a bottom portion of a stack of pallets from side to side prior to the stack of pallets being moved to the second alignment device and a pallet dispenser. The figure also shows the second alignment device positioned at the front opening of a pallet dispenser which dispenses pallets to a conveyor system, only a portion of which is shown in FIG. 1.

FIG. 1 shows the apparatus for vertically aligning and accumulating stacks of pallets that is the subject of the invention. The apparatus of the invention vertically aligns the bottom portion of a stack of pallets (three or more depending on the height dimensions of the pallets) prior to the stack of pallets being dispensed by a pallet dispenser 14 of a conveying system 16. The apparatus of the invention is designed to be used with most any type of prior art pallet dispenser 14 that feeds pallets, one by one to a conventional prior art pallet conveying system 16. The apparatus of the invention is preferably used with an open front pallet dispenser or a field converted open front pallet dispenser. Because the pallet dispenser 14 and the pallet conveying system 16 with which the apparatus of the invention are used are conventional and known in the prior art, the details of the pallet dispenser 14 and the conveying system 16 will not be described in detail herein.

Figure 2:
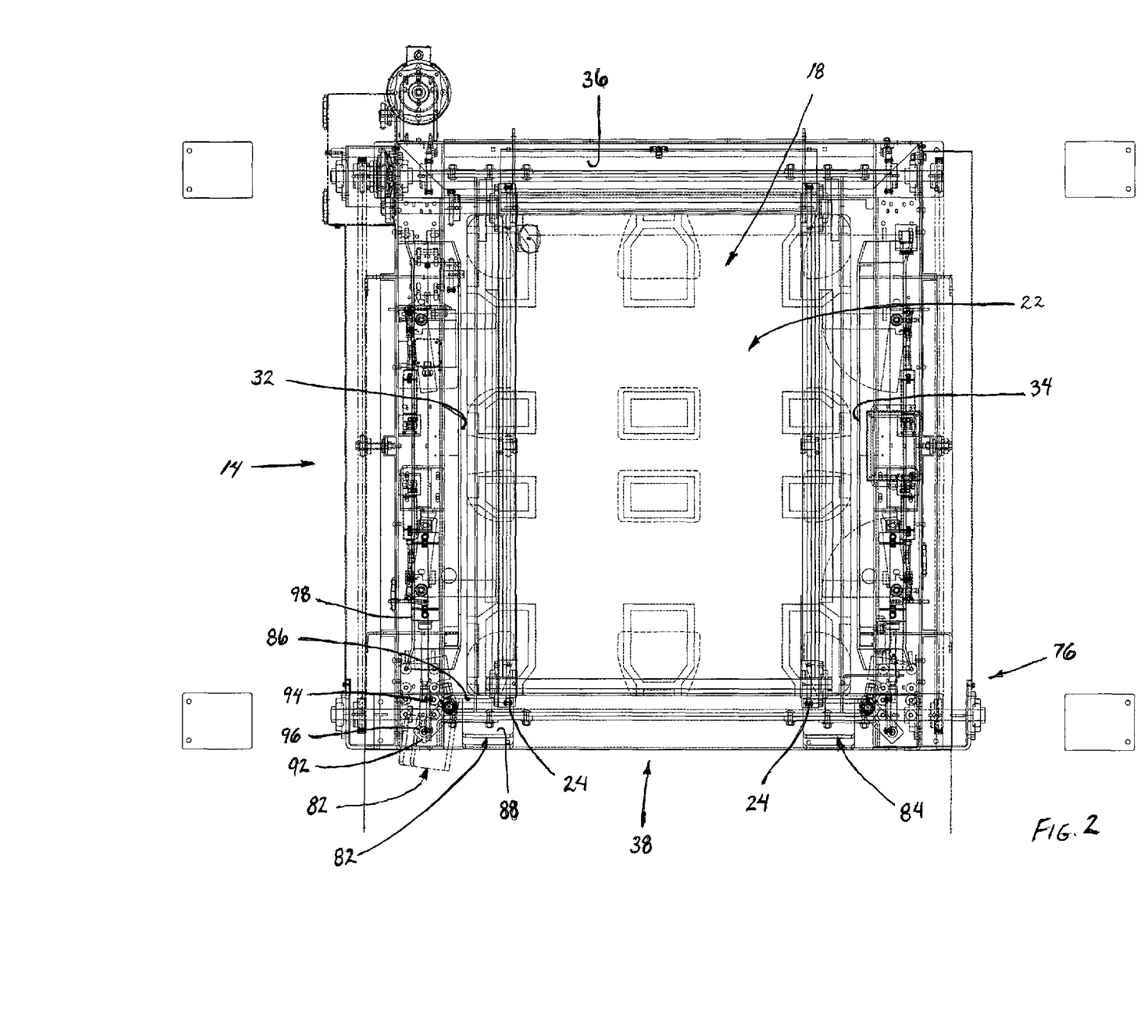
FIG. 2 is a top plan view of the pallet dispenser shown in FIG. 1 with the left and right side compression plates of the second alignment device positioned on opposite sides of the pallet dispenser front opening.

The construction of open front pallet dispenser 14 of the apparatus is shown in FIGS. 2-5. In FIG. 2, the pallet dispenser 14 is shown to have a generally rectangular configuration that is dimensioned to receive and support a vertical stack of pallets 18 in an interior area 22 of the pallet dispenser. The stack of pallets 18 is represented by the dashed lines shown in FIGS. 2 and 6. A conveyor 24 inside the pallet dispenser interior area 22 receives stacks of pallets from the aligning and accumulating apparatus of the invention and dispenses pallets, one at a time, from the pallet dispenser. Basically, as in other types of pallet dispensers, the open front pallet dispenser 14 receives a stack of pallets in the pallet dispenser, separates the bottommost pallet of the stack from the remainder of the pallets in the stack, conveys the separated pallet out of the pallet dispenser and then repeats these steps to sequentially separate and convey pallets from the bottom of the stack of pallets remaining in the pallet dispenser. Although the pallet dispenser 14 shown in the drawing figures is a pallet dispenser that separates a pallet from the bottom of a stack and then dispenses the separated pallet, other types of known pallet dispensers could be used with the aligning and accumulating apparatus of the invention.

The open front pallet dispenser 14 has left 32 and right 34 alignment surfaces on opposite sides of the dispenser interior 22, and a rear surface 36 at the back of the dispenser interior and between the left and right vertical guide surfaces. The dispenser 14 has a front opening or input opening 38 on an opposite side of the dispenser interior 22 from the rear surface 36. The stack of pallets 18 is fed into the dispenser interior 22 through the front opening 38.

A first, horizontal spacing between the left and right alignment surfaces 32, 34 is slightly larger than the width of a pallet in the stack of pallets 18 positioned in the pallet dispenser 14. This difference in the horizontal spacing of the pallet dispenser left and right alignment surfaces 32, 34 and the width dimension of a typical pallet allows for a limited amount of vertical misalignment of pallets in the stack 18 positioned in the pallet dispenser 14 and allows for pallet size variation.

Figure 3:
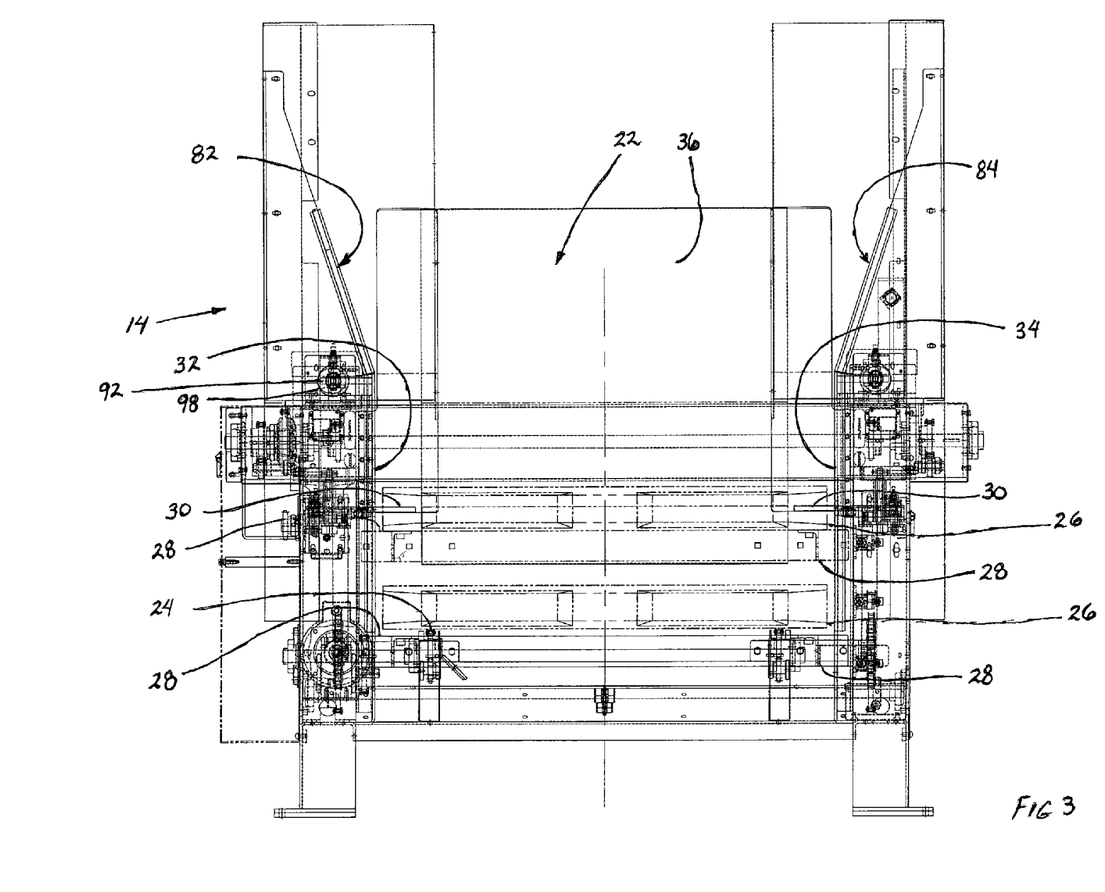
FIG. 3 is a front elevation view of the pallet dispenser of FIG. 2 and the left and right side compression plates.
Figure 4:
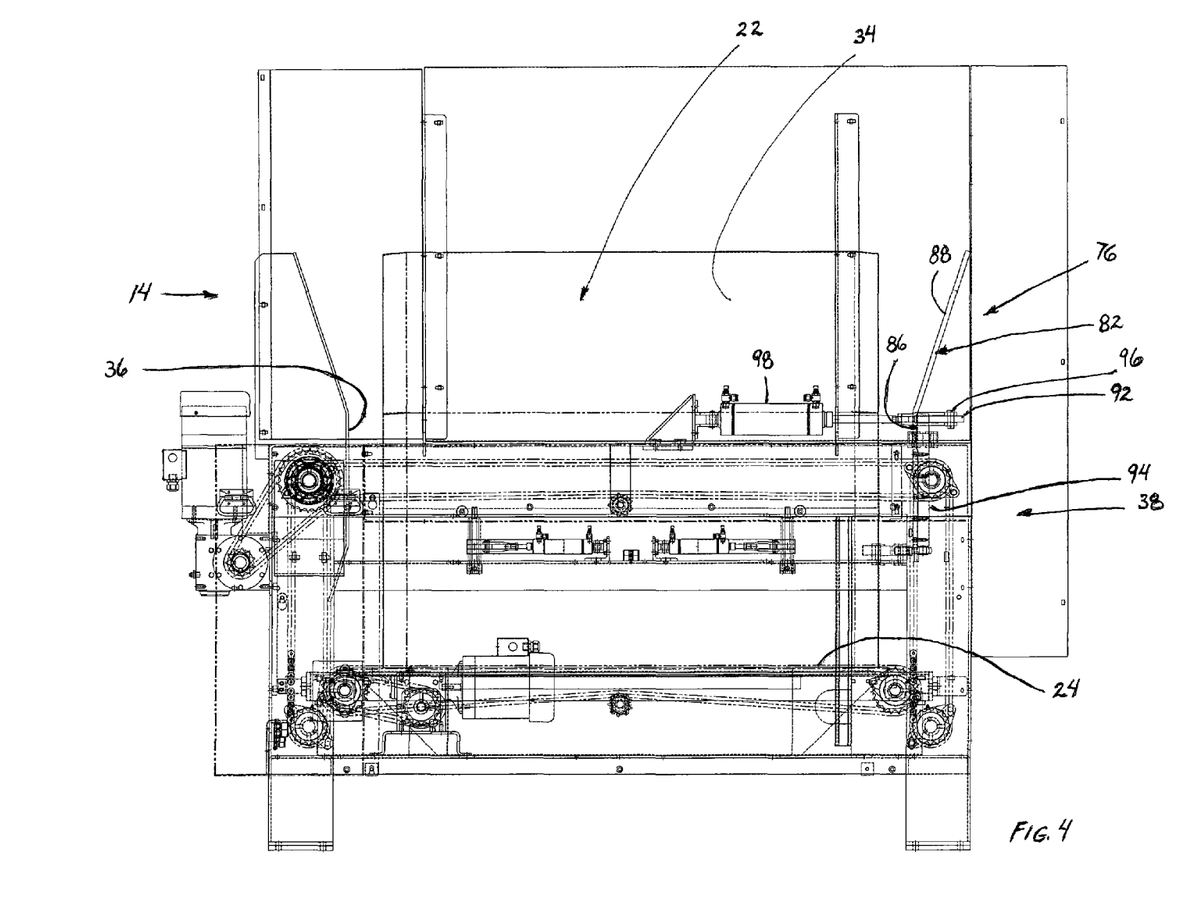
FIG. 4 is a left side elevation view of the pallet dispenser of FIG. 2, shown with the left side compression plate.
Figure 5:
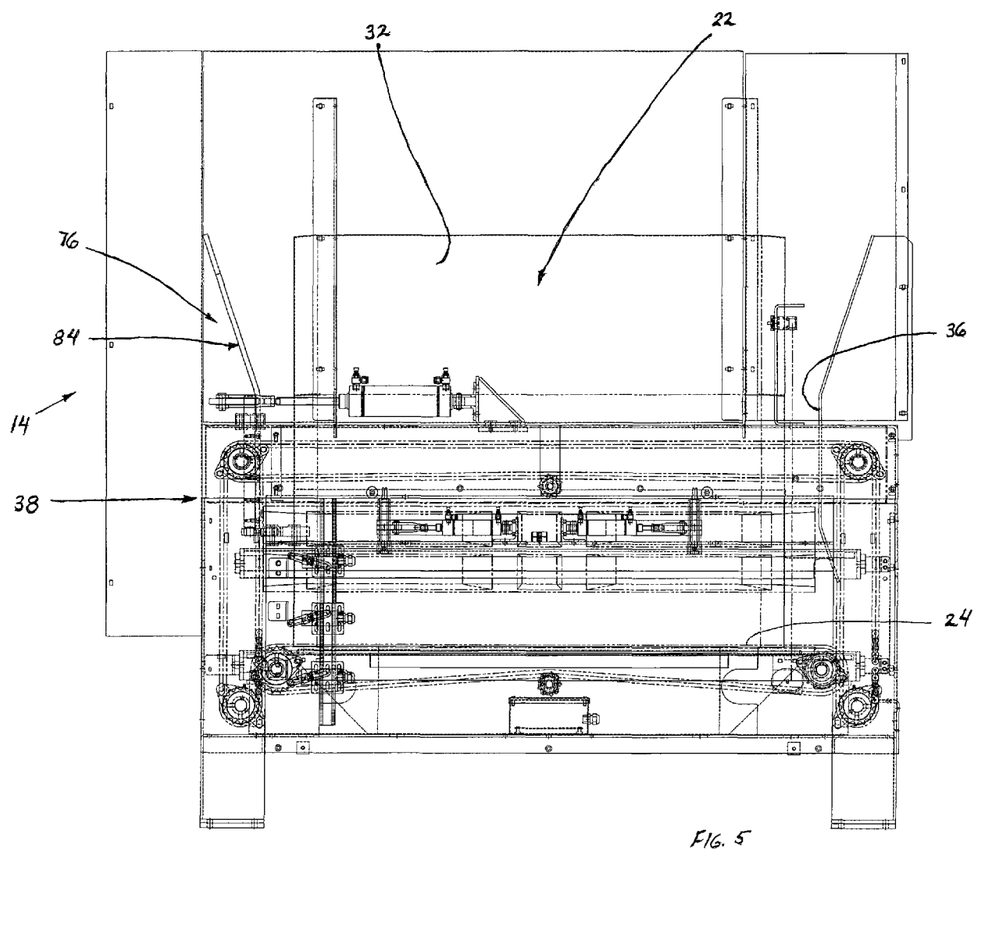
FIG. 5 is a right side elevation view of the pallet dispenser of FIG. 3, shown with the right side compression plate.

As shown in FIGS. 3-5, the left and right alignment surfaces 32, 34 and the rear surface 36 of the pallet dispenser 14 have lower portions that are oriented vertically, and upper portions that are angled outwardly away from the dispenser interior 22.

The angled upper portions of the left and right alignment surfaces 32, 34 and the rear surface 36 provide some vertical alignment of the pallets of a stack of pallets 18 positioned in the pallet dispenser 14 as the stack of pallets are moved downwardly by operation of the pallet dispenser.

The first alignment device of the invention 12 is specifically designed for providing initial vertical alignment from side to side of a bottom portion of a stack of pallets prior to the stack of pallets being delivered to the open front pallet dispenser 14 such as the one discussed above. As shown in FIG. 1, the first alignment device 12 is therefore designed to be positioned adjacent the front opening 38 of the pallet dispenser 14 whereby the device 12 may deliver an initially aligned stack of pallets through the dispenser front opening 38 and into the dispenser interior 22.

Figure 6:
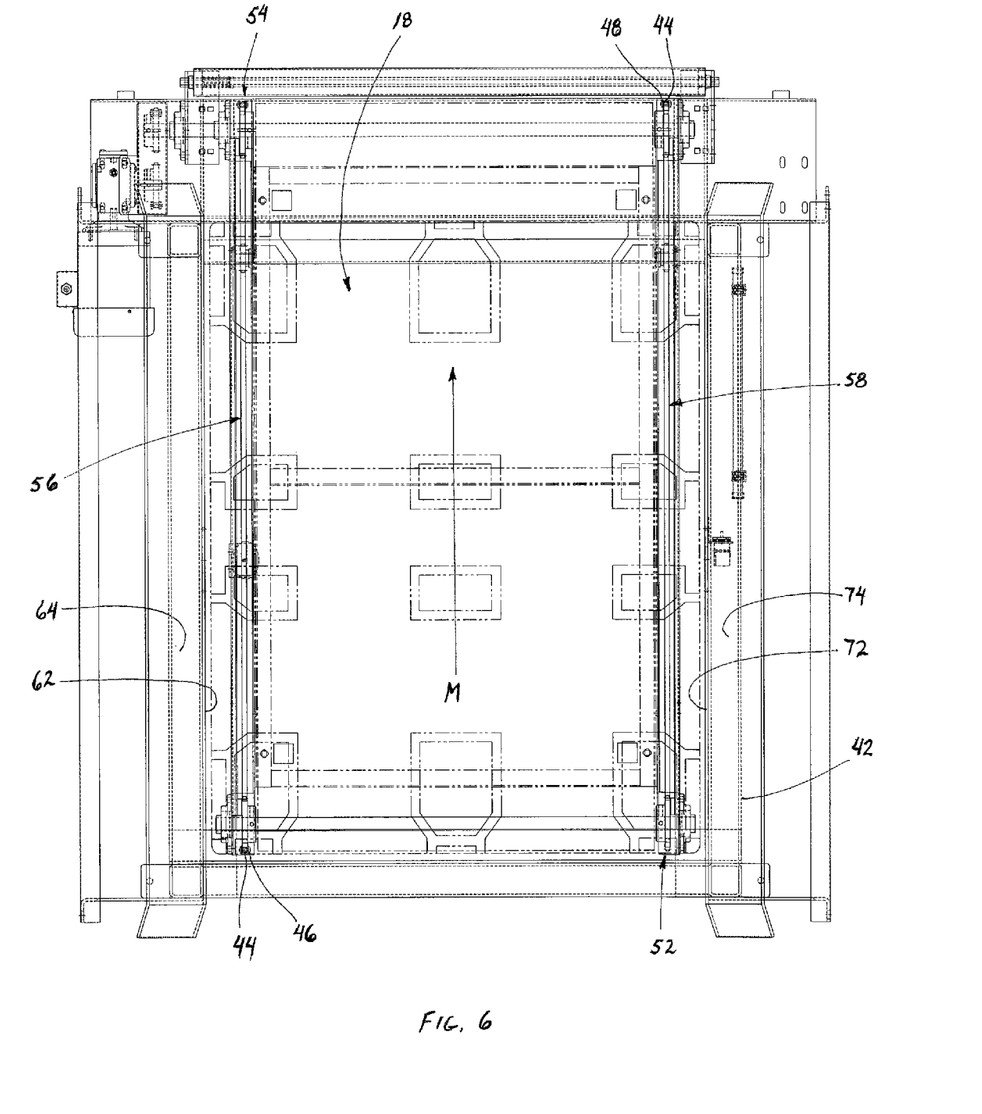
FIG. 6 is a top plan view of the apparatus of the invention minus the left and right compression plates which are positioned at opposite sides of the front opening of the pallet dispenser as shown in FIG. 2.
Figure 7:
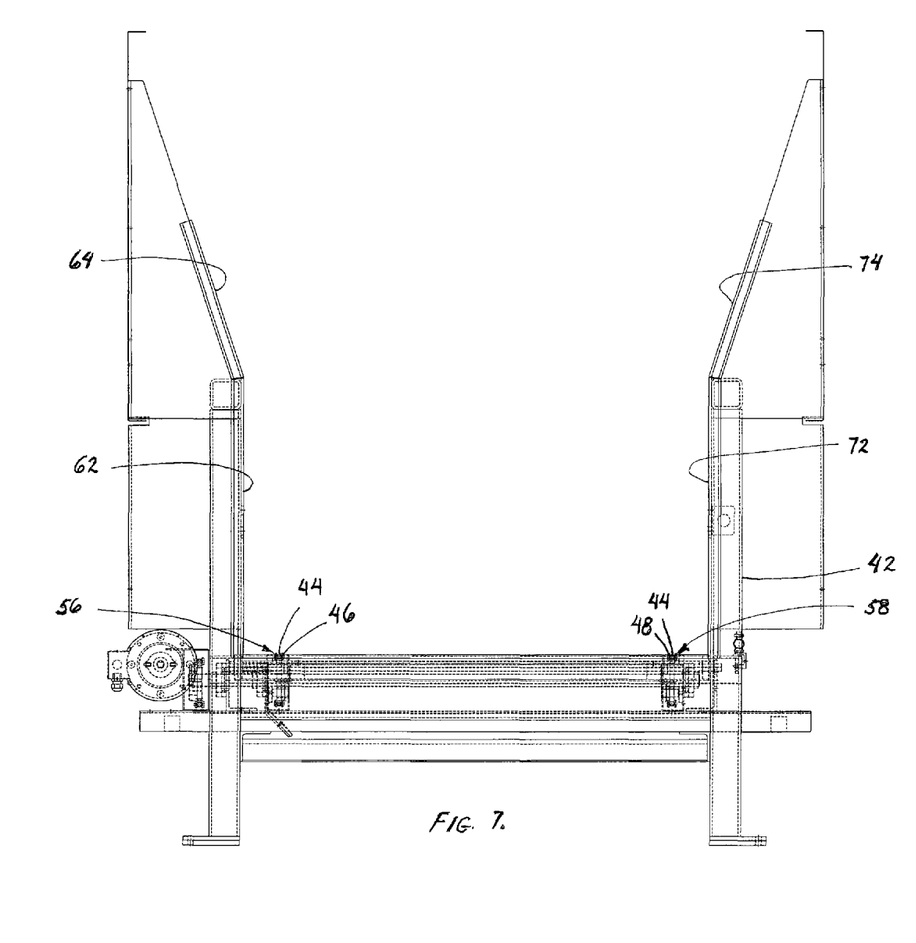
FIG. 7 is a front elevation view of the apparatus of the invention shown in FIG. 6.
Figure 8:
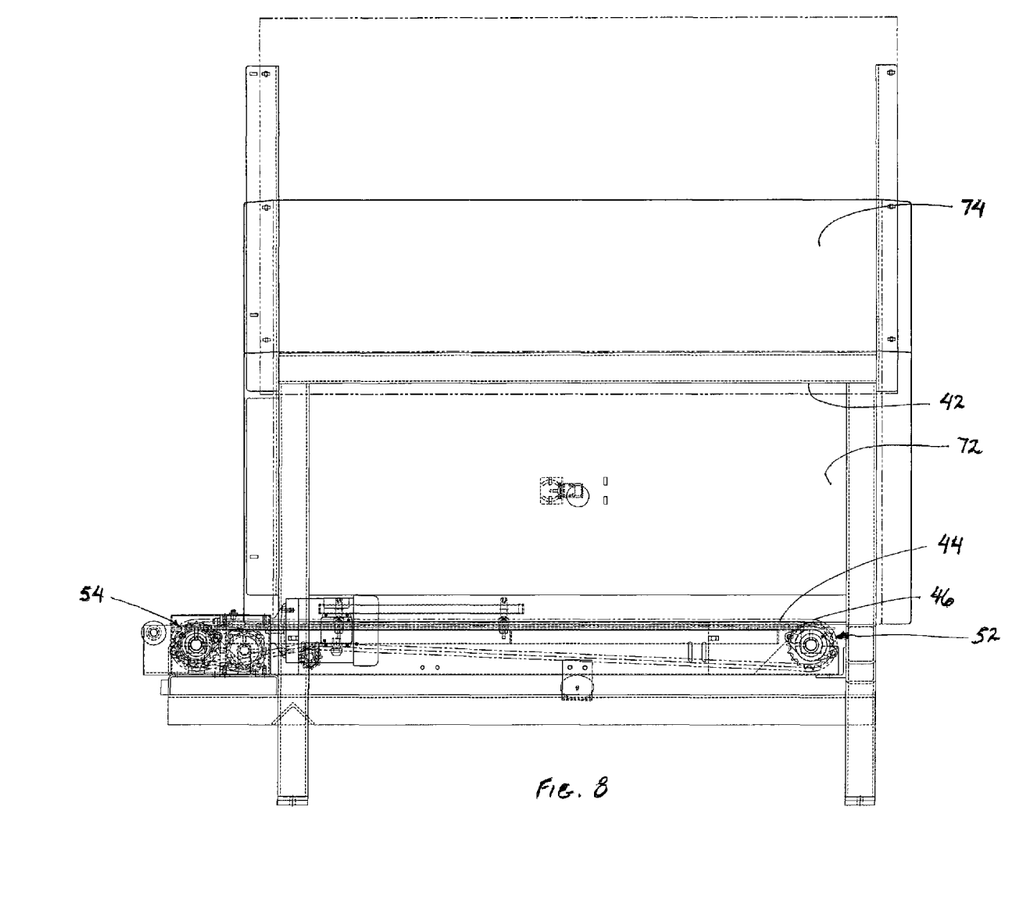
FIG. 8 is a left side view of the apparatus of the invention shown in FIG. 6, with the right side view being substantially a mirror image of FIG. 8.

A significant portion of the first alignment device 12 is shown in FIGS. 6, 7 and 8. Other important elements of the device 12 are shown in FIGS. 2-5 and 9-11. These Figures will be referenced in the later description of these other important elements of the device 12.

Referring to FIGS. 6-8, the first alignment device 12 is shown supported on a base 42 having a generally horizontal, rectangular configuration. The base 42 is dimensioned sufficiently large to provide support to a vertical stack of pallets 18 on the base.

The base 42 supports a conveyor 44. The conveyor 44 is shown in the drawing FIGS. 6-8 as being comprised of a pair of chain conveyors 46, 48. The chain conveyors 46, 48 define the length of the conveyor 44 between an input end 52 and an opposite output end 54 of the conveyor, and opposite left 56 and right 58 sides of the conveyor. The tops of the chain conveyors 46, 48 function as the conveying surface of the conveyor 44. The conveying surface supports a stack of pallets 18 in the first alignment device 12 and is operable to move the stack of pallets 18 in a direction of movement through the first alignment device 12 from the conveyor input end 52 to the conveyor output end 56. The direction of movement of the conveyor 44 is represented by the arrow labeled "M" in FIGS.

1 and 6. As shown in FIG. 1, with the first alignment device 12 used with the open front pallet dispenser 14, the conveyor output end 54 of the alignment device is positioned immediately adjacent the front opening 38 of the pallet dispenser 14. Although the conveyor 44 is shown in the drawing figures as being comprised of a pair of chain conveyors 46, 48, other types of conveyors may be employed in the device 12.

With the first alignment device 12 positioned adjacent the open front pallet dispenser 14, at least one stack of pallets can be accumulated in the first alignment device 12 while the pallet dispenser 14 is dispensing a second stack of pallets. Alternatively, the first alignment device 12 can be spaced a distance from the pallet dispenser 14 that will allow additional stacks of pallets to be accumulated between the first alignment device 12 and the pallet dispenser 14. In such an arrangement, the conveyor 44 of the first alignment device 12 would have an extended length between the first alignment device 12 and the open front pallet dispenser 14. The extended length of the conveyor 44 would separate the first alignment device 12 and the pallet dispenser 14 in the area 60 shown in FIG. 1. The additional length of the conveyor 44 between the first alignment device 12 and the pallet dispenser 14 could be dimensioned to support one or more additional stacks of pallets that have had there bottom portion of pallets previously aligned from side to side by the first alignment device 12. This enables the accumulation of additional stacks of pallets on the extended length of the conveyor 44 that are ready to be conveyed into the pallet dispenser 14.

A left panel having a lower portion 62 and an upper portion 64 is supported by the first alignment device base 42 adjacent the left side 56 of the conveyor. The left panel lower portion 62 has a substantially flat, vertically oriented surface that faces toward the conveyor 44 and generally extends along the conveyor length. The upper portion of the left panel 64 extends upwardly from the top edge of the panel lower portion 62 and is angled away from the conveyor 44. The left panel upper portion 64 also has a substantially flat surface.

A right panel having a lower portion 72 and an upper portion 74 is supported by the first alignment device base 42 adjacent the right side of the conveyor 44. The right panel lower portion 72 has a substantially flat, vertically oriented surface that faces toward the conveyor 44. The right panel upper portion 74 extends upwardly from the right panel lower portion 72 and is angled away from the conveyor 44. The right panel lower portion 72 and upper portion 74 both generally extend along the length of the conveyor 44. The right panel is basically a mirror image of the left panel.

There is a second horizontal spacing distance between the left panel lower portion surface 62 and the right panel lower portion surface 72. The second horizontal spacing distance is slightly smaller than the first horizontal spacing distance between the pallet dispenser left and right alignment surfaces. Referring to FIG. 7, it can be seen that a stack of pallets loaded, for example by a forklift, into the first alignment device 12 will first be positioned between the left panel upper portion 64 and the right panel upper portion 74 before being loaded downwardly onto the conveying surface of the conveyor 44. As the stack of pallets is lowered, the sides of any significantly misaligned pallets in the bottom portion of the stack will engage with at least one of the left panel upper portion 64 and the right panel upper portion 74 as they are lowered. This causes the pallet or pallets engaging the left panel upper portion surface 64 and/or the right panel upper portion surface 74 to be moved horizontally in the stack of pallets to a more side to side vertically aligned position relative to the stack of pallets. This side to side realigned bottom portion of the pallet stack fits within the second horizontal spacing distance or the smaller horizontal side to side spacing distance between the left panel lower portion surface 62 and the right panel lower portion surface 72. The vertical realignment of the pallets in the bottom portion of the stack is sufficient to enable the stack of pallets to be delivered by the first alignment device conveyor 44 through the pallet dispenser front opening 38 and into the pallet dispenser interior 22.

The apparatus of the invention also comprises a second alignment device 76 that includes a left compression plate 82 adjacent the left side 56 of the conveyor 44 and the conveyor output end 54, and a right compression plate 84 adjacent the right side 58 of the conveyor 44 and the conveyor output end 54. The left plate 82 and right plate 84 are positioned at opposite sides of the pallet dispenser forward opening 38 and are shown with the pallet dispenser 14 in FIGS. 2-5. When the conveyor 44 of the first alignment device 12 has an extended length separating the first alignment device 12 from the pallet dispenser 14, the left and right compression plates 82, 84 would still be positioned on the opposite sides of the conveyor 44 and adjacent the front opening 38 of the pallet dispenser 14. The left and right plates 82, 84 are substantially mirror images of each other and therefore only the left plate 82 will be described in detail. The left plate 82 is shown removed from the pallet dispenser 14 in drawing FIGS. 9-11.

Figure 9:
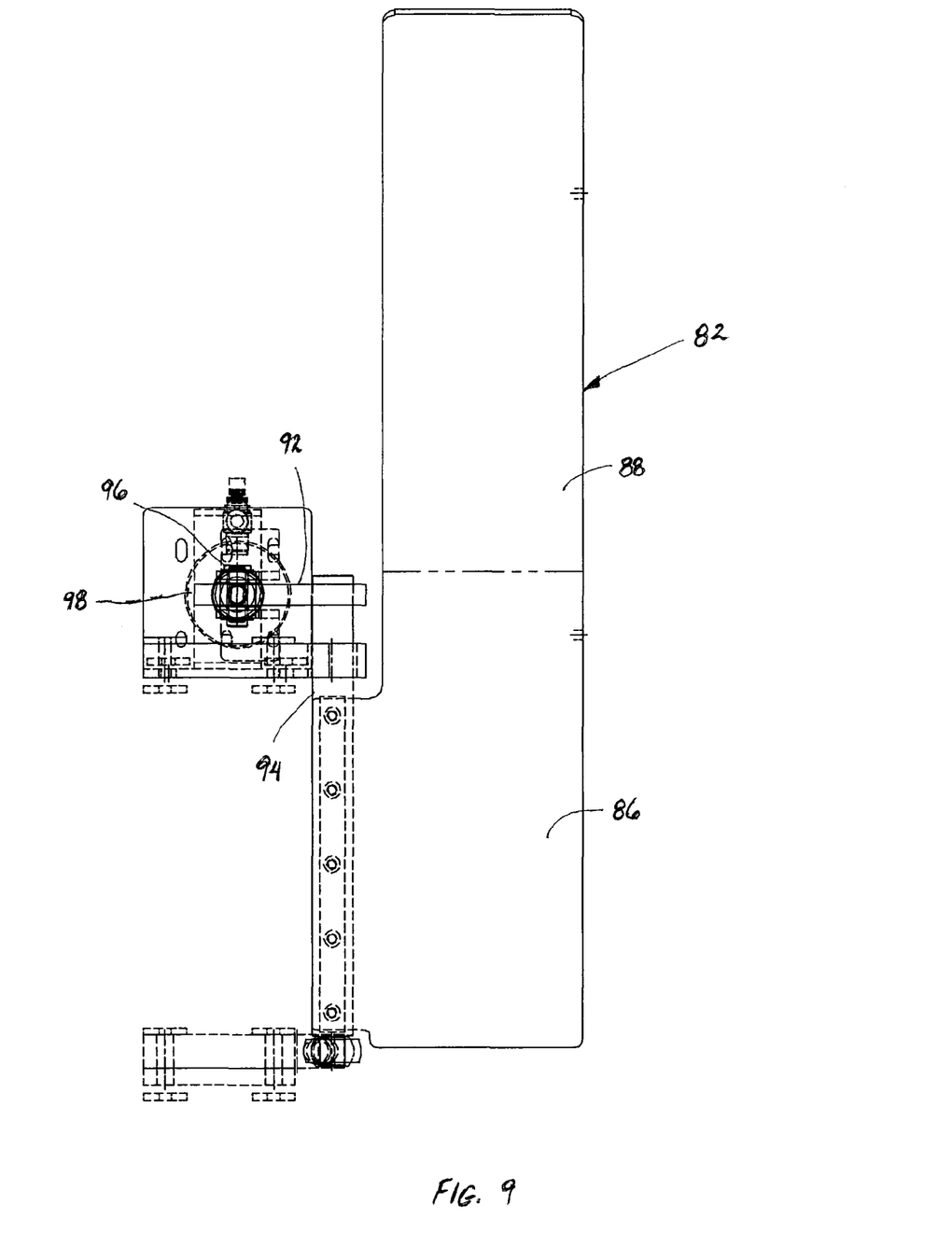
FIG. 9 is an enlarged view of the left side compression plate.
Figure 10:
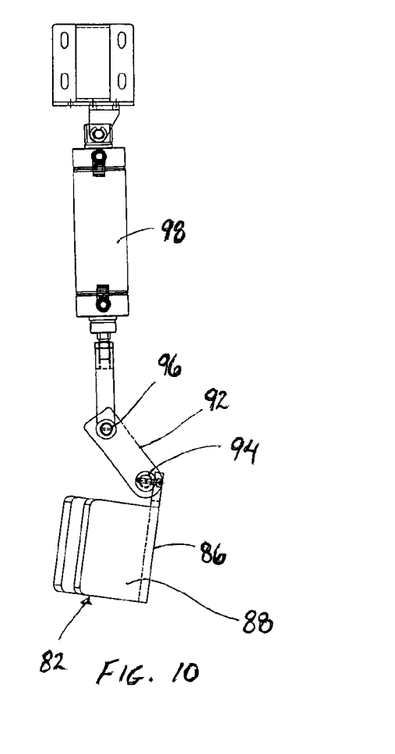
FIG. 10 is a top plan view of the left side compression plate in the first position of the left side compression plate.

Referring to FIGS. 9-10, the left compression plate 82 is shown having a lower portion with a surface 86 that is substantially flat and vertically oriented relative to the pallet dispenser 14. An upper portion of the left plate 82 extends upwardly from a top edge of the lower portion surface 86. The upper portion has a substantially flat surface 88 that is angled relative to the lower portion surface 86.

The left compression plate upper portion surface 88 and lower portion surface 86 are secured to a pivot arm 92. The pivot arm or crank arm 92 has a pivoting support connection 94 at one end of the arm adjacent the left plate 82, and a pivoting support connection 96 to a reciprocating actuator 98 at the opposite end of the pivot arm 92. The support connection 94 supports the left plate 82 adjacent the output end 54 of the first alignment device conveyor 44 and adjacent the forward opening 38 of the pallet dispenser for pivoting movement of the left plate 82. The actuator 98 is supported on the pallet dispenser 14 as shown in the drawings.

Figure 11:
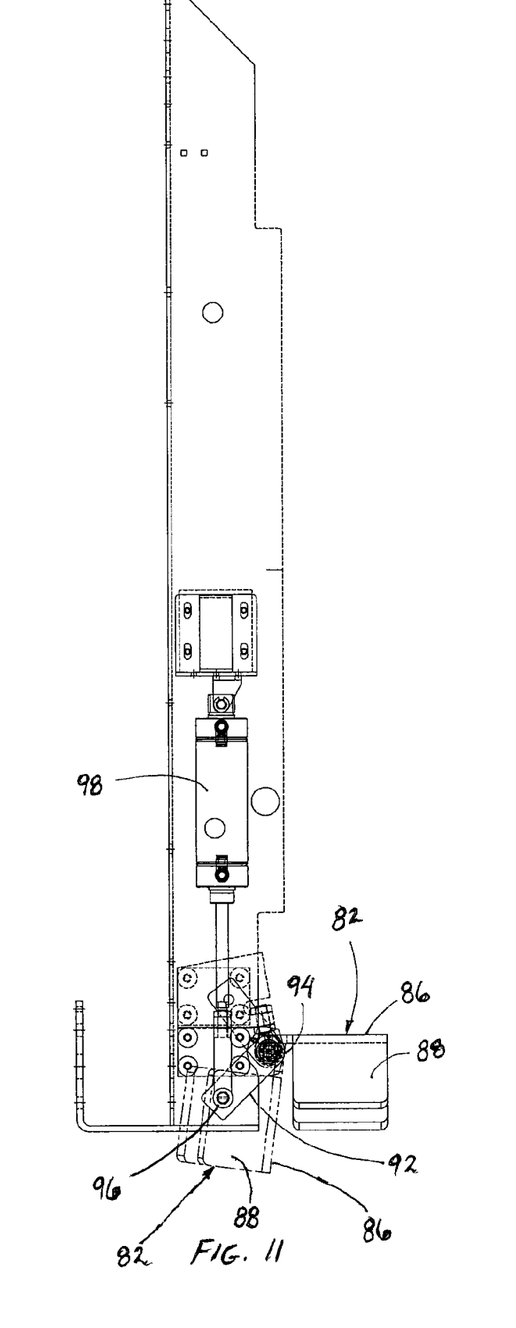
FIG. 11 is a top plan view of the left side compression plate shown in the second position of the left side compression plate.

Selective actuation of the actuator 98 pivots the left compression plate 82 between first and second positions of the left plate 82 relative to the first alignment device 12 and the pallet dispenser 14. FIG. 10 shows the actuator 98 in its retracted condition where the left plate 82 is positioned in its first position relative to the first alignment device 12 and the pallet dispenser 14. FIG. 11 shows the actuator 98 in its extended condition where it moves the left plate 82 to its second position relative to the first alignment device 12 and the pallet dispenser 14.

As stated earlier, both the left 82 and right 84 compression plates are mirror images of each other. FIG. 2 shows the left 82 and right 84 plates in solid lines in their first positions relative to the pallet dispenser 14, and shows the left plate 82 in dashed lines in its second position relative to the pallet dispenser 14. FIG. 3 shows the left plate 82 and the right plate 84 in their first positions relative to the pallet dispenser 14. FIG. 4 shows the left plate 82 in its second position relative to the pallet dispenser 14. FIG. 5 shows the right plate 84 in its second position relative to the pallet dispenser 14.

As stated earlier, in use, the first alignment device 12 of the invention is positioned immediately adjacent the forward opening 38 of the open front pallet dispenser 14 as shown in FIG. 1. A stack of pallets loaded, for example by a forklift, into the first alignment device 12 will first be positioned between the left panel upper portion 64 and the right panel upper portion 74 before being loaded downwardly onto the conveying surface of the conveyor 44. As the stack of pallets is lowered, any significantly misaligned pallets in the bottom portion of the stack will engage with at least one of the left panel upper portion 64 and the right panel upper portion 74 as they are lowered. This will cause the pallet or pallets engaging with the left panel upper portion 64 and/or the right panel upper portion 74 to be moved horizontally in the stack of pallets to a more side to side vertically aligned position relative to the stack of pallets. This side to side realignment of the bottom portion of the stack continues as the stack of pallets is lowered and positioned on the conveying surface of the conveyor 44. The realigned bottom portion of the pallet stack fits within the second horizontal spacing distance or the smaller spacing distance between the left panel lower portion surface 62 and the right panel lower portion surface 72 of the first alignment device 12. The vertical side to side realignment of the pallets in the bottom of the stack is sufficient to enable the stack of pallets to be delivered by the first alignment device conveyor 44 through the pallet dispenser front opening 38 and into the pallet dispenser interior 22.

As the stack of pallets is moved in the direction of movement by the first alignment device conveyor 44 toward the pallet dispenser 14, the left 82 and right 84 compression plates are in their first positions. In the first positions, the left compression plate lower portion surface 86 and the right compression plate lower portion surface 88 are angled away from each other and form a funnel in the direction of movement (M) of the conveyor surface. When the stack of pallets is moved by the first alignment device conveyor 44 toward the pallet dispenser 14, any engagement of a pallet in the bottom portion of the stack with either of the left 82 compression plate lower portion surface or right 84 compression plate lower portion surface will result in the plate surface directing the stack of pallets toward the center of the first alignment device conveyor 44 and toward the center of the pallet dispenser front opening 38. The left 82 and right 84 compression plate lower portion surfaces remain in their first positions with the surfaces angled away from each other and forming a funnel in the direction of movement as the stack of pallets is moved in the direction of movement (M) from the first alignment device conveyor 44 through the dispenser front opening 38 and into the pallet dispenser 14.

As the stack of pallets exits the first alignment device conveyor 44 through the dispenser front opening 38 and the stack arrives at the dispenser rear surface 36, the conveyor 44 is stopped and the left and right compression plates 82, 84 of the second alignment device, together with the respective left 82 and right 84 plate lower portion surfaces are moved from their first positions toward their second positions. As the left 82 and right 84 compression plate lower portion surfaces are moved from their first positions to their second positions, the surfaces of the compression plates 82, 84 pivot in an arcuate movement first toward the conveyor direction of movement (M) and then along the direction of movement (M) toward the pallet dispenser front opening 38. This enables the left 82 and right 84 compression plate lower portion surfaces to engage with the bottom portion of the back or rear of the stack of pallets on the apparatus conveyor 44 and push the stack of pallets in the direction of movement (M) into the pallet dispenser 14. The left 82 and right 84 compression plate surfaces continue to push the stack of pallets into the pallet dispenser interior 22 and into engagement with the rear surface 36 of the pallet dispenser to further vertically align from front to back the pallets in the stack.

In the above manner, the apparatus of the invention vertically aligns the bottom portion of pallets in a pallet stack and enables accumulating one or more stacks of pallets having bottom portions that have been aligned from side to side for delivery to a pallet dispenser and further alignment from front to back.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An apparatus for vertically aligning a stack of pallets prior to the stack of pallets being moved to a pallet dispenser where the pallet dispenser has left and right alignment surfaces with a first horizontal spacing distance between the left and right alignment surfaces positioning the left and right alignment surfaces to engage respective left and right sides of pallets moved to the pallet dispenser to vertically align the pallets, the apparatus comprising:

a conveyor positioned adjacent the pallet dispenser, the conveyor having a length with opposite input and output ends and opposite left and right sides, the conveyor having at least one conveying surface that extends the length of the conveyor and is operable to support a stack of pallets and move the stack of pallets in a direction of movement from the conveyor input end to the conveyor output end and into the pallet dispenser;

a left panel adjacent the left side of the conveyor and extending along the conveyor length, the left panel having a substantially flat vertically oriented surface facing toward the conveyor;

a right panel adjacent the right side of the conveyor and extending along the conveyor length, the right panel having a substantially flat vertically oriented surface facing toward the conveyor;

a second horizontal spacing distance between the left panel surface and the right panel surface, the second horizontal spacing distance being smaller than the first horizontal spacing distance whereby pallets of a stack of pallets positioned on the conveying surface engage with the left and right panel surfaces and are moved toward a vertical alignment by the left and right panel surfaces that enables the stack of pallets to move on the conveying surface into the pallet dispenser;

a left compression plate adjacent the left side of the conveyor and the conveyor output end, the left compression plate having a surface;

a right compression plate adjacent the right side of the conveyor and the conveyor output end, the right compression plate having a surface;

both the left and right compression plate surfaces angleing toward each other as they extend in the direction of movement of the conveying surface; whereby, the left and right compression plate surfaces are positioned to engage misaligned pallets of a stack of pallets moved on the conveying surface and move the pallets toward vertical alignment of the pallets as the stack of pallets is moved toward the pallet dispenser.

2. The apparatus of claim 1, further comprising:
the second horizontal spacing distance being at most 10 inches smaller than the first horizontal spacing distance.

3. The apparatus of claim 1, further comprising:
the conveyor length enabling the conveyor to support at least one stack of pallets on the conveying surface between the pallet dispenser and the left and right panels.

4. The apparatus of claim 1, further comprising:
the left and right compression plates being movable between first and second positions relative to the conveyor where in the first positions the left and right compression plate surfaces angle toward each other in the direction of movement of the conveying surface and when moved from the first positions to the second positions the left and right compression plate surfaces move along the direction of movement and engage pallets in the stack of pallets moved on the conveying surface in the direction of movement of the conveying surface and push the pallets toward the pallet dispenser.

5. The apparatus of claim 4, further comprising:
the left and right compression plate surfaces having substantially flat vertically oriented surface portions and substantially flat angled surface portions that extend upwardly from the substantially fiat vertical surface portions and angle away from the conveyor.

6. The apparatus of claim 4, further comprising:
the left and right compression plates are mounted on pivoting supports relative to the conveyor whereby the left and right compression plate surfaces move in a pivoting movement from their first positions to their second positions.

7. The apparatus of claim 4, wherein the pallet dispenser has an interior between the left and right alignment surfaces and between a rear end and a forward opening, of the pallet dispenser, the apparatus further comprising:
the conveyor output end being positioned adjacent the pallet dispenser forward opening; and,
the left and right compression plate surfaces when moved to their second positions engage pallets in the stack of pallets moved on the conveying surface in the direction of movement of the conveying surface and push the pallets across the pallet dispenser forward opening and into the pallet dispenser interior.

8. An apparatus for vertically aligning a stack of pallets prior to the stack of pallets being moved to a pallet dispenser where the pallet dispenser has an interior defined by a rear surface and left and right alignment surfaces on opposite sides of the rear surface that are positioned to engage pallets in the stack of pallets moved into the pallet dispenser to vertically align the pallets in the stack, the apparatus comprising:
a conveyor positioned adjacent the pallet dispenser, the conveyor having a length with opposite input and output ends and opposite left and right sides, the conveyor having at least one conveying surface that extends the length of the conveyor and is operable to support a stack of pallets and move the stack of pallets in a direction of movement from the conveyor input end to the conveyor output end and into the pallet dispenser interior;
a left panel adjacent the left side of the conveyor and extending along the conveyor length, the left panel having a substantially flat vertically oriented surface facing toward the conveyor;
a right panel adjacent the right side of the conveyor and extending along the conveyor length, the right panel having a substantially flat vertically oriented surface facing toward the conveyor;
a left compression plate adjacent the left side of the conveyor and the conveyor output end, the left compression plate having a surface that is movable between first and second positions relative to the conveyor output end;
a right compression plate adjacent the right side of the conveyor and the conveyor output end, the right compression plate having a surface that is movable between first and second positions relative to the conveyor output end;
where in the first positions of the left compression plate surface and the right compression plate surface both the left and right compression plate surfaces are displaced away from the conveyor and when moved from the first positions to the second positions the left and right compression plate surfaces move toward the conveyor and then along the direction of movement to engage with a stack of pallets moved by the conveying surface in the direction of movement and push the stack of pallets in the direction of movement toward the pallet dispenser rear surface to vertically align the pallets in the stack.

9. The apparatus of claim 8 where the left and right alignment surfaces of the pallet dispenser are separated by a first horizontal spacing distance, the apparatus further comprising:
the left panel surface and the right panel surface being separated b a second horizontal spacing distance that is smaller than the first horizontal spacing distance.

10. The apparatus of claim 9, further comprising:
the second horizontal spacing distance being at most 10 inches smaller than the first horizontal spacing distance.

11. The apparatus of claim 8, further comprising:
the left and right compression plate surfaces having substantially flat vertically oriented surface portions and substantially flat angled surface portions that extend upwardly from the substantially flat vertical surface portions and angle away from the conveyor.

12. The apparatus of claim 8, further comprising:
the left and right compression plates are mounted on pivoting supports relative to the conveyor whereby the left and right compression plate surfaces move in a pivoting movement from their first positions to their second positions.

13. The apparatus of claim 8, further comprising:
both the left and right compression plate surfaces in the first positions angle toward the direction of movement as they extend along the direction of movement.

14. The apparatus of claim 8, further comprising:
the conveyor length enabling the conveyor to support at least one stack of pallets on the conveying surface between the pallet dispenser and the left and right panels.

15. The apparatus of 14, further comprising:
the left and right compression plate surfaces having substantially flat vertically oriented surface portions and substantially flat angled surface portions that extend upwardly from the substantially flat vertical surface portions and angle away from the conveyor.

16. An apparatus for vertically aligning a stack of pallets prior to the stack of pallets being moved to a pallet dispenser where the pallet dispenser has left and right alignment surfaces positioned to engage respective left and right sides of the pallets in the stack to vertically align the pallets in the stack, the apparatus comprising:
a conveyor having a length with opposite input and output ends and opposite left and right sides, the conveyor having at least one conveying surface that extends the length of the conveyor and is operable to support a stack of pallets and move the stack of pallets in a direction of movement from the conveyor input end to the conveyor output end;

a left compression plate adjacent the left side of the conveyor and the conveyor output end, the left compression plate having a surface that is movable between a first position where the left compression plate surface is angled inward toward the conveying surface direction of movement as the left compression plate surface extends in the direction of movement and a second position where the left compression plate surface is positioned substantially perpendicular to the direction of movement;

a right compression plate adjacent the right side of the conveyor and the conveyor output end, the right compression plate having a surface that is movable between a first position where the right compression plate surface is angled inward toward the conveying surface direction of movement as the right compression plate surface extends in the direction of movement and a second position where the right compression plate surface is positioned substantially perpendicular to the direction of movement;

whereby, with the left and right compression plate surfaces in the first positions the left and right compression plate surfaces angle toward each other in the direction of movement where the left and right compression plate surfaces will engage with pallets of a stack of pallets moved on the conveying surface in the direction of movement and move the pallets between the left and right compression plate surfaces toward vertical alignment, and with the left and right compression plate surfaces moving from the first positions to the second positions the left and right compression plate surfaces will engage with pallets of a stack of pallets moved by the conveying surface out of the conveyor output end and move the pallets in the direction of movement into the pallet dispenser.

17. The apparatus of claim 16, further comprising;

a left panel adjacent the left side of the conveyor and extending along the conveyor length, the left panel having a substantially flat vertically oriented surface facing toward the conveyor, the left panel being positioned en an opposite side of the left compression plate from the pallet dispenser;

a right panel adjacent the right side of the conveyor and extending along the conveyor length, the right panel having a substantially flat vertically oriented surface facing toward the conveyor, the right panel being positioned on an opposite side of the right compression plate from the pallet dispenser.

18. The apparatus of claim 17 where the left and right alignment surfaces of the pallet dispenser are separated by a first horizontal spacing distance, the apparatus further comprising:

the left and right panel surfaces being separated by a second horizontal spacing distance that is smaller than the first horizontal spacing distance.

19. The apparatus of claim 18, further comprising:

the second horizontal spacing distance being at most 10 inches smaller than the first horizontal spacing distance.

20. The apparatus of claim 16, further comprising:

the left and right compression plates are mounted on pivoting supports relative to the conveyor whereby the left and right compression plate surfaces move in a pivoting movement from their first positions to their second positions.

21. The apparatus of claim 16, further comprising:

the conveyor length enabling the conveyor to support at least one stack of pallets on the conveying surface between the pallet dispenser and the left and right panels.

* * * * *